United States Patent [19]
Siefkes

[11] Patent Number: 5,335,639
[45] Date of Patent: Aug. 9, 1994

[54] HEAT EXCHANGER HAVING CLOSE PACKED SPHERES

[76] Inventor: Donald Siefkes, 2754 Charter Blvd., Troy, Mich. 48083

[21] Appl. No.: 81,657

[22] Filed: Jun. 22, 1993

Related U.S. Application Data

[63] Continuation-in-part of Ser. No. 929,285, Aug. 13, 1992, abandoned.

[51] Int. Cl.⁵ .............................................. F02M 31/00
[52] U.S. Cl. ..................................... 123/545; 123/549
[58] Field of Search ............... 123/538, 557, 549, 556, 123/543, 545, 547, 552

[56] References Cited

U.S. PATENT DOCUMENTS

| | | | |
|---|---|---|---|
| 4,086,893 | 5/1978 | Bernecker | 123/122 |
| 4,089,314 | 5/1978 | Bernecker | 123/133 |
| 4,605,523 | 8/1986 | Smillie | 123/538 |
| 5,044,346 | 9/1991 | Tada et al. | 123/536 |
| 5,092,303 | 3/1992 | Brown | 123/538 |

OTHER PUBLICATIONS

Gates, Bruce C.; *Catalytic Chemistry*; Dec. 1992; pp. 378–399.

*Primary Examiner*—Tony M. Argenbright
*Assistant Examiner*—M. Macy
*Attorney, Agent, or Firm*—Reising, Ethington, Barnard, Perry & Milton

[57] ABSTRACT

An apparatus (16) for preheating combustion fluids such as air, fuel or fuel-air mixtures upstream of the combustion chamber in an internal combustion engine (10). The apparatus (16) generally includes a heat exchanger (18) and an assembly (46) for heating the heat exchanger. The improvement involves constructing the heat exchanger (18) from a plurality of closely-packed beads (20) each having a spherical shape and each comprised of homogeneous aluminum filling the entire space within the outer spherical shape to provide a high surface area heat exchanger for heating the combustion fluid as the fluid passes around the beads.

13 Claims, 1 Drawing Sheet

HEAT EXCHANGER HAVING CLOSE PACKED SPHERES

This is a continuation-in-part of copending application(s) Ser. No. 07/929,285, filed on Aug. 13, 1992, now abandoned.

TECHNICAL FIELD

The subject invention relates to internal combustion engines, and more specifically to devices for preheating combustion fluids such as air, fuel or fuel-air mixtures upstream of the combustion chamber.

BACKGROUND OF THE INVENTION

Increasing the vaporization of fuels can greatly improve the efficiency of internal combustion engines. This can also improve the cold-starting characteristics of engines using fuels such as ethanol and diesel fuel. To this end, many different assemblies have been devised for pre-heating either the fuel, the air or the fuel-air mixture upstream of the engine's combustion cylinder. The typical assembly includes some type of heat exchanger for heating the fluid as it passes through, over or around the heat exchanger and some type of heating means for heating the heat exchanger. Ideally, it is desirable to provide a heat exchanger having a very high surface area for heating the fluid thoroughly as the fluid passes through the heat exchanger. Many different attempts have been made to construct heat exchangers having high surface area: for example, U.S. Pat. Nos. 4,086,893 and 4,089,314 to Bernecker teach porous ceramic particles agglomerated in a canister which serve as a heat exchanger for heating fuel. Unfortunately, the particles are of random shapes and varying sizes, and may agglomerate to clog the flow of fuel. U.S. Pat. No. 5,044,346 to Tada et al. teaches oblong ceramic beads for transferring heat to a fuel. However, ceramic is a poor conductor of heat, and so ceramic heaters cannot transfer heat efficiently to the fuel.

U.S. Pat. No. 5,092,303 to Brown teaches a catalyst assembly including a canister having a plurality of spherical catalytic beads disposed therein for reacting with fuel upstream of a combustion chamber. Brown also teaches a heating element for heating the catalyst and the fuel. Brown does not teach that his catalytic beads serve as a heat exchanger, nor does he teach that his beads are solid metal, which would enable his beads to act as an efficient heat exchanger. In fact, the general practice in the catalyst art involves using solid or porous ceramic beads having a thin platinum coating, rather than solid platinum beads. In order to function efficiently, the catalyst need be only one atom thick. The ceramic support used has a rough, i.e. porous, surface which has a higher surface area than smooth surfaces. This practice is explained in detail in the textbook, *Catalytic Chemistry*, by Bruce C. Gates and published by John Wiley & Sons, 1992, pp. 378-399. The practice is shown graphically in a photo on page 379 of that book. Solid platinum beads would be relatively smooth, and thus lack the necessary surface area to efficiently catalyze the reaction with the fuel. Solid platinum beads are undesirable also because they would be prohibitively expensive and unnecessarily heavy.

SUMMARY OF THE INVENTION AND ADVANTAGES

An internal combustion engine comprises an internal combustion chamber and a fluid passageway disposed upstream of the chamber for conducting combustion fluids such as air, fuel or a fuel-air mixture into the chamber. The engine also includes heat supplying means for supplying a predetermined amount of heat to the combustion fluids over a predetermined time interval. The heat supplying means includes a heat exchanger for thoroughly heating the combustion fluid as the combustion fluid flows through the heat exchanger toward the combustion chamber. The heat exchanger comprises a plurality of individual bits of heat conducting material agglomerated to define a porous structure disposed in the passageway and extending across the passageway to conduct heat across the passageway and to present a large heating surface area for heating the combustion fluid as the fluid flows among the bits toward combustion chamber. The engine is characterized by the bits being solid metal beads having a spherical shape and uniform size agglomerated to define an array of contiguous high heat conducting elements for efficiently transferring heat across the passageway to thoroughly heat the combustion fluid, the array defining uniform passageways to allow uniform flow of the combustion fluid through the heat exchanger.

By agglomerating a plurality of such solid metal beads, especially spherical beads, one can devise an efficient, inexpensive heat exchanger having an unusually high surface area per unit volume ratio.

FIGURES IN THE DRAWINGS

Other advantages of the present invention will be readily appreciated as the same becomes better understood by reference to the following detailed description when considered in connection with the accompanying drawings wherein.

DESCRIPTION OF THE PREFERRED EMBODIMENT

Figure 1A:
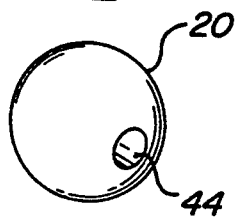
FIG. 1A is a perspective view of one of the spherical bits which comprise the heat exchanger.

Referring to the Figures, wherein like numerals indicate like or corresponding parts throughout the several views, an internal combustion engine is generally shown at 10. The engine 10 comprises an internal combustion chamber 12 and a fluid passageway 14 disposed upstream of the chamber for conducting combustion fluids such as air, fuel or a fuel-air mixture into the chamber 12. The engine 10 also includes heat supplying means generally indicated at 16 for supplying a predetermined amount of heat to the combustion fluids over a predetermined time interval. The heat supplying means 16 includes a heat exchanger 18 for thoroughly heating the combustion fluid as the combustion fluid flows through the heat exchanger 18 toward the combustion chamber 12. The heat exchanger 18 comprises a plurality of individual bits 20 of heat conducting material agglomerated to define a porous structure disposed in the passageway 14 and extending across the passageway to conduct heat across the passageway and to present a large heating surface area for heating the combustion fluid as the fluid flows among the bits 20 toward the combustion chamber 12. The assembly is characterized by the bits 20 being solid metal beads having a spherical shape and uniform size agglomerated to define an array of contiguous high heat conducting elements for efficiently transferring heat across the passageway to thoroughly heat the combustion fluid, the array defining uniform passageways to allow uniform flow of the combustion fluid through the heat exchanger.

The environment in which the invention operates is a typical internal combustion engine 10 including an intake means 22 for controlling fluid flow from the fluid passageway 14 to the combustion chamber 12, an exhaust means 24 for controlling the flow of exhaust from the combustion chamber 12 and two relatively moving parts 26, 28 defining the combustion chamber. Thus, the engine 10 could be the standard reciprocating engine as shown in the drawings or a rotary-type engine such as a Wankel engine. In the instant case, the engine 10 includes an air intake passageway 30, a fuel line 14 and a mixture passageway 32 into which the fuel line and the air intake passageway 30 lead. Fuel is injected into the mixture passageway 32 by means of fuel ports or fuel injectors 34 which atomize the fuel as it is fed into mixture passageway 32. The mixture passageway 32 in turn conducts the fuel-air mixture to the intake means 22 of the combustion chamber 12.

The heat supplying means includes containing means 36 for containing the bits 20 in a predetermined section of the passageway 14 as the fluid flows past the bits. The containing means includes a canister 36 disposed along the passageway 14, where the canister includes a fluid inlet 38 and a fluid outlet 40 disposed downstream of the fluid inlet whereby the fluid flows into the canister 36 through the fluid inlet 38 and out of the canister through the fluid outlet 40. The canister 36 includes retaining means 42 disposed at the inlet 38 and the outlet 40 for retaining the bits 20 within the canister. The retaining means 42 may be screening or other means for preventing the bits 20 from escaping the canister 36 through the inlet or the outlet. The canister 36 is ideally constructed to minimize heat loss. To this end the canister 36 is either made from aluminum and surrounded with an insulating jacket, or the canister is made from some insulating material, or non heat-conducting material which will not be damaged by the fuels passing through it. Such material may be either polyphenylene sulfide or polyoxymethylene. The polyphenylene sulfide may be somewhat more desirable because of its ability to withstand higher temperatures. The canister 36 may be attached to the fuel line 14 in a number of ways, such as by welding the fuel line to each side of the canister or by providing a threaded connection so that the fuel line can thread onto or into the inlet 38 and outlet 40 of the canister.

The term "bit" 20 is intended to be the broadest name for the individual parts which comprise the heat exchanger 18. These "parts" may be balls, chips, pebbles, beads, cubes, pieces or any other small heat conducting elements, usually metal, which may be agglomerated to form a porous heat exchanger 18 for heating fluid as the fluid passes through the heat exchanger by passing around the bits, balls, beads, etc.

In the preferred embodiment, the beads are made of solid metal in order to conduct heat efficiently across the passageway. By "solid," applicant means that the beads 20 comprise homogeneous metal filling the entire space defined by the spherical periphery. In other words, the spherical volume of the bead 20 consists entirely of metal. Said another way, the spherical volume of the beads 20 is composed purely of metal: there are no hollow pockets or pockets comprised of other materials such as ceramic. "Solid" does not mean that the metals are pure metals: alloys can be used. The preferred metals will be light weight per unit volume, i.e low density, high in thermal conductivity, low in specific heat per unit volume, non-corrodible and inexpensive. Aluminum is one such metal combining all of these qualities. Thus, the preferred metal will have a density less than or equal to the density of aluminum, 2.7 grams/cubic centimeter. The metal will also have a thermal conductivity as good as or better than aluminum, which has a thermal conductivity of about 0.50 cal/(seconds)(square centimeter)(degree C/centimeter) at 18 degrees Celsius. The metal will finally have a specific heat per unit volume of less than 0.5805 cal/cubic centimeter—degree celsius. Any metals or metal alloys that meet these limitations will be ideal for the subject invention. Other metals such as magnesium, zinc, copper, nickel and tin may also be used, though they lack the ideal characteristics, and though they tend to be more expensive than aluminum. Steel is a corrodible metal which should not be used in connection with fuels containing water, or in an environment open to air. Steel can be used in a gasoline fuel line where the steel contacts only the gasoline.

Figure 1B:
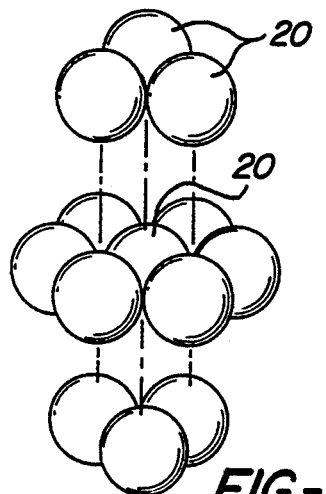
FIG. 1B is a perspective view of a plurality of spherical bits which comprise the heat exchanger, showing in particular that up to twelve bits may contact a single bit at one time.
Figure 2:
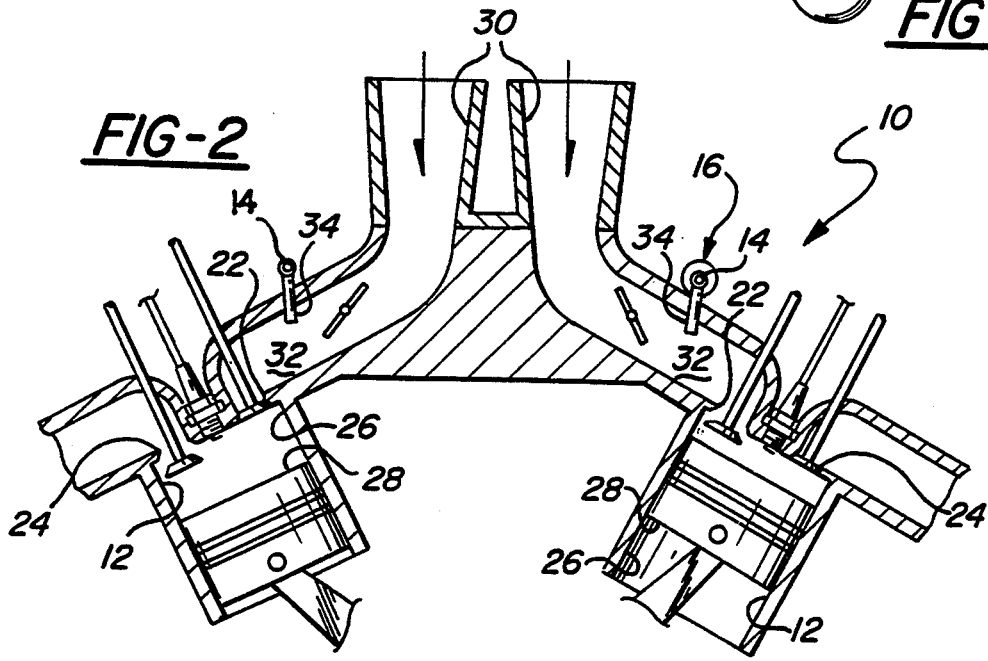
FIG. 2 is a cut away view of the internal combustion engine.

Each of the bits or beads 20 is generally spherical in shape, and may include at least one hole 44 formed therethrough for increasing the surface area of the bead. If one or more holes 44 are formed through the sphere 20, as by drilling, for example, the surface area of the sphere can be increased even more. The spherical beads 20 are maintained in a close-packed array within the canister 36. Such a close-packed array has two important properties: it involves a high degree of contact among the spheres 20, which facilitates the conduction of heat from one sphere to another; and it provides for space between and among the spheres 20 through which the combustion fluid may flow. FIG. 1B illustrates how a single sphere 20 may actually contact up to twelve other spheres 20 in the close-packed array, and how there is still space among the spheres to enable the flow of combustion fluids.

The heat exchanger 18 is the essence of the invention. Where it is placed in the engine 10 and how it is heated is of less importance.

The fluid passageway 14 comprises the fuel line 14 for supplying fuel to the combustion chamber 12. This is to say that in the preferred embodiment, the heat exchanger 18 is placed in the fuel line 14 to preheat the fuel as the fuel travels toward the combustion chamber 12. This is accomplished by connecting the canister 36 in the fuel line 14 so that fuel flows through an upstream segment of the fuel line, through the canister 36, and then through a downstream segment of the fuel line toward the combustion chamber 12. The heat exchanger 18 may also be placed in the air intake or in the mix passageway immediately upstream of the combustion chamber 12 and downstream of where the fuel is mixed with the air.

Figure 3:
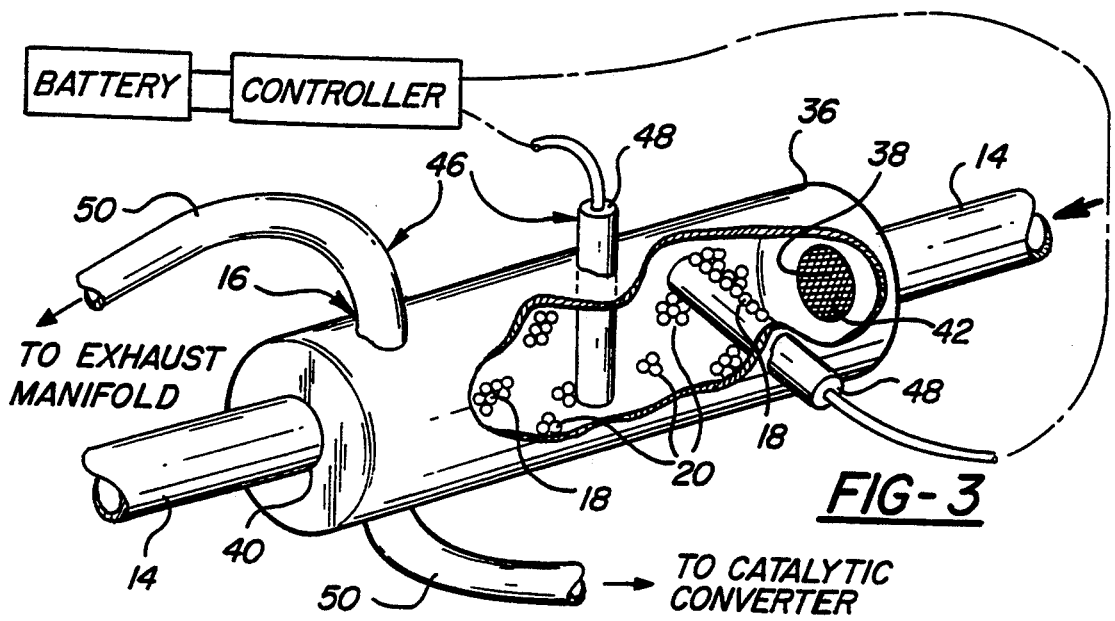
FIG. 3 is a view of the electrical resistance heater, the exhaust duct heater and the canister which is cut away to show the plurality of spherical bits comprising the heat exchanger.

The heat supplying means 16 includes heating means 46 for heating the heat exchanger 18. The heating means 46 may comprise an electrical resistance heater 48 placed in contact with the heat exchanger 18, i.e. the close-packed array of spheres. For example, the electrical resistance heater 48 is actually a plurality of typical glow plugs extending through the canister 36 into the bits or beads 20 of heat conducting material (for clarity, only two of the heating plugs are shown in FIG. 3). The plugs 48 will contact several of the spheres 20 and transfer heat to these spheres by conduction. In turn, heat will be transferred from these spheres 20 to the other spheres in the heat exchanger 18 by conduction. The plugs 48 screw into holes tapped in the canister 36. The plugs 48 are arranged in criss-cross pattern (i.e. ninety degrees apart around the canister) as shown in FIG. 3. The plugs 48 are typical resistance wire plugs each having a resistance wire embedded in magnesium oxide and surrounded by a stainless steel jacket. The plugs 48 are hooked directly to the vehicle's twelve volt battery, and thus the plugs are "on" whenever the ignition of the vehicle is "on." An electrical resistance-type heater 48 may be necessary to pre-heat certain fuels before the engine 10 is started, but becomes less important after the engine is warm. After the engine 10 is started it is perhaps more efficient to heat the heat exchanger 18 with exhaust gas. Thus the heating means 46 may be comprised of an exhaust duct 50 conducting heated exhaust gas from the combustion chamber 12, where the duct 50 is placed in contact with the heat exchanger 18 as shown in FIG. 3. In this case, the duct 50 will contact several of the spheres 20 and conduct heat to them. These spheres 20, in turn, will conduct heat to the other spheres in the heat exchanger 18. Other means for heating the heat exchanger 18 may also be used. For, example, it is known in the art to heat a heat exchanger 18 using a coolant fluid duct (not shown) which conducts the heated coolant fluid away from the engine 10. Also, a combination of heating means 46 may be used: for example, FIG. 3 shows the use of both electrical resistance heating and heating from the exhaust gas.

If an electrical resistance type heater 48 is used, i.e. one or more glow plugs, the plugs 48 can be threaded to screw into tapped holes in the canister 36. The threads will prevent fuel from leaking out of the canister 36 between the canister and the plugs. If the exhaust duct 50 is used, it cannot easily thread into the canister 36 because the duct extends completely through the canister, unlike the glow plugs 48. How the exhaust duct 50 is secured to the canister 36 depends on what type of material is used in the canister. If the canister 36 is metal, the duct 50 can be welded to the canister. If the canister 36 is plastic, a sleeve of the type used commonly in the plumbing art (not shown) can fit around the duct 50 and thread into threads tapped in the hole through the canister. When the sleeve is fully threaded into the canister 36 it will attach the duct 50 to the canister and seal around the duct to prevent fuel leakage out of the canister.

As a general rule, the type of heater selected depends somewhat on the type of fuel used in the engine. If an alcohol based fuel is used, the fuel needs to be pre-heated to improve its starting characteristics. Thus, an electric resistance heater should be used at least in the start-up phase because the exhaust heater will provide no heat until the engine is actually running. If a standard gasoline-type fuel is used, this fuel does not need to be pre-heated; so an exhaust heater alone may be used.

To assemble the heat exchanger 18, the heating means 46 is first assembled to the canister 36. This involves inserting either or both of an electrical resistance heater 48 or an exhaust duct 50 bearing heated exhaust fluid through the canister 36. Next, the beads 20 are poured or otherwise inserted into the canister 36 through an opening somewhere in the canister. The beads 20 should flow into the canister 36 around any heating element which extends through the canister. Enough beads 20 should be inserted so that the beads form a close-packed array, touching both each other and the heating element. In this way heat can be spread through all the beads 20 from the heating elements. Once enough beads 20 are placed in the opening, the opening is closed and the canister 36 is placed in its operating position. The opening can be at the end of the canister, and can be closed by a screw-on lid, for example.

The assembly may also include control means for controlling the amount of heat transferred to the heat exchanger 18 and the time interval over which the heat is transferred. Control means may be particularly important when a combination of heaters is used, in such cases the control means could control when one heater is on and the other is off. If an exhaust heater 50 is used, the control means may be a simple thermostat within the canister 36 which operates in connection with a solenoid to close the exhaust duct 50 leading through the canister when a predetermined temperature is reached. If an electrical resistance heater 48 is used, a ceramic heater having positive temperature coefficient (PTC) may be used which will shut itself off when the ceramic material reaches a predetermined temperature.

The invention has been described in an illustrative manner, and it is to be understood that the terminology which has been used is intended to be in the nature of words of description rather than of limitation.

Obviously, many modifications and variations of the present invention are possible in light of the above teachings. It is, therefore, to be understood that within the scope of the appended claims wherein reference numerals are merely for convenience and are not to be in any way limiting, the invention may be practiced otherwise than as specifically described.

We claim:

1. An internal combustion engine (10) comprising:
an internal combustion chamber (12);
a fluid passageway (14) disposed upstream of said chamber (12) for conducting into said chamber (12) combustion fluids such as one of the following: air, fuel and a fuel-air mixture;
heat supplying means (16) for supplying a predetermined amount of heat to the combustion fluid over a predetermined time interval;
said heat supplying means (16) including a heat exchanger (18) for heating the combustion fluid as the combustion fluid flows through said heat exchanger (18) toward said combustion chamber (12);
said heat exchanger (18) comprising a plurality of individual bits (20) of heat conducting material agglomerated to define a porous structure disposed in said passageway (14) and extending across said passageway to conduct heat across said passageway and to present a large heating surface area for heating the combustion fluid as the fluid flows among said bits (20) toward said combustion chamber (12);

characterized by said bits (20) being solid metal beads having a spherical shape and uniform size, each of said beads consisting entirely of metal, said beads being agglomerated to define an array of contiguous high heat conducting elements for efficiently transferring heat across said passageway to thoroughly heat the combustion fluid, said array defining uniform passageways to allow uniform flow of the combustion fluid through said heat exchanger.

2. An internal combustion engine (10) as set forth in claim 1 further characterized by including containing means (36) for containing said bits (20) in a predetermined section of said passageway (14) as said fluid flows past said bits.

3. An internal combustion engine (10) as set forth in claim 2 further characterized by said bits (20) including at least one hole (44) formed therethrough for increasing the surface area of said bit.

4. An internal combustion engine (10) as set forth in claim 3 further characterized by said containing means including a canister (36) disposed along said passageway (14), said canister including a fluid inlet (38) and a fluid outlet (40) disposed downstream of said fluid inlet whereby the fluid flows into said canister (36) through said fluid inlet and out of said canister through said fluid outlet (40).

5. An internal combustion engine (10) as set forth in claim 4 further characterized by said canister (36) including retaining means (42) disposed at said inlet and said outlet for retaining said bits (20) within said canister.

6. An internal combustion engine (10) as set forth in claim 1 further characterized by including an intake means (22) for controlling fluid flow from said fluid passageway (14) to said combustion chamber (12), an exhaust means (24) for controlling the flow of exhaust from said combustion chamber and two relatively moving parts (26,28) defining said combustion chamber (12).

7. An internal combustion engine (10) as set forth in claim 1 further characterized by said fluid passageway (14) comprising a fuel line (14) for supplying fuel to said combustion chamber (12).

8. An internal combustion engine (10) as set forth in claim 1 further characterized by said heat supplying means (16) including heating means (46) for heating said heat exchanger (18).

9. An internal combustion engine (10) as set forth in claim 8 further characterized by said heating means (46) comprising an electrical resistance heater (48) placed in contact with said heat exchanger (18).

10. An internal combustion engine (10) as set forth in claim 8 further characterized by said heating means (46) comprising an exhaust duct (50) conducting heated exhaust gas from said combustion cylinder, said duct being placed in contact with said heat exchanger (18).

11. An internal combustion engine (10) as set forth in claim 1 further characterized by including control means for controlling the amount of heat transferred to said heat exchanger (18) and the time interval over which the heat is transferred.

12. An internal combustion engine (10) as set forth in claim 1 further characterized by said solid metal beads (20) having a density less than the density of platinum.

13. An internal combustion engine (10) as set forth in claim 1 further characterized by said solid metal beads (20) having a thermal conductivity greater than that of platinum.

* * * * *